United States Patent [19]

McClintock et al.

[11] 3,886,757

[45] June 3, 1975

[54] REDUCTION OF HYDRATE FORMATION IN A NATURAL GAS STREAM BY CONTACTING WITH ANIT-FREEZE AGENT

[75] Inventors: William A. McClintock; Merlin O. Clark, both of Bartlesville, Okla.

[73] Assignee: Phillips Petroleum Company, Bartlesville, Okla.

[22] Filed: Dec. 3, 1973

[21] Appl. No.: 421,367

Related U.S. Application Data

[63] Continuation of Ser. No. 101,372, Dec. 24, 1970, abandoned.

[52] U.S. Cl. ............................ 62/20; 55/31; 203/66; 203/42; 208/188; 62/17; 62/23; 62/28
[51] Int. Cl. ............................................. F25j 3/00
[58] Field of Search ............... 62/17, 20, 23, 14, 27, 62/28, 13, 21, 24, 23; 55/31, 32, 29, 30; 260/676 H, 676 AD; 203/63, 66, 42, 43, 44, 45, 46, 39, 18, 12, 91, 92, 93, 94, 95, 97, 98; 208/187, 188, 310, 333, 340–346

[56] References Cited
UNITED STATES PATENTS
2,981,661  4/1961  Black ................................. 203/46

| | | |
|---|---|---|
| 3,099,619 | 7/1963 | Harper ................................. 203/42 |
| 3,324,627 | 6/1967 | Kohrt ................................... 55/32 |
| 3,330,124 | 7/1967 | Marshall .............................. 55/32 |
| 3,370,636 | 2/1968 | Francis et al. ...................... 203/18 |
| 3,531,915 | 10/1970 | Nagel et al. .......................... 52/32 |

FOREIGN PATENTS OR APPLICATIONS
1,133,497  7/1962  Germany ............................... 55/32

*Primary Examiner*—Norman Yudkoff
*Assistant Examiner*—Frank Sever

[57] ABSTRACT

Liquid desiccant-antifreeze agent, used in treating a stream of natural gas to reduce the moisture content of said gas, is recovered from the gas in a combination process. Said process comprises a combination of water washing a hydrocarbon-treating agent-water stream separated from the treated gas stream, and fractionating the resulting water wash stream to recover a water-treating agent stream for use in treating said gas.

8 Claims, 1 Drawing Figure

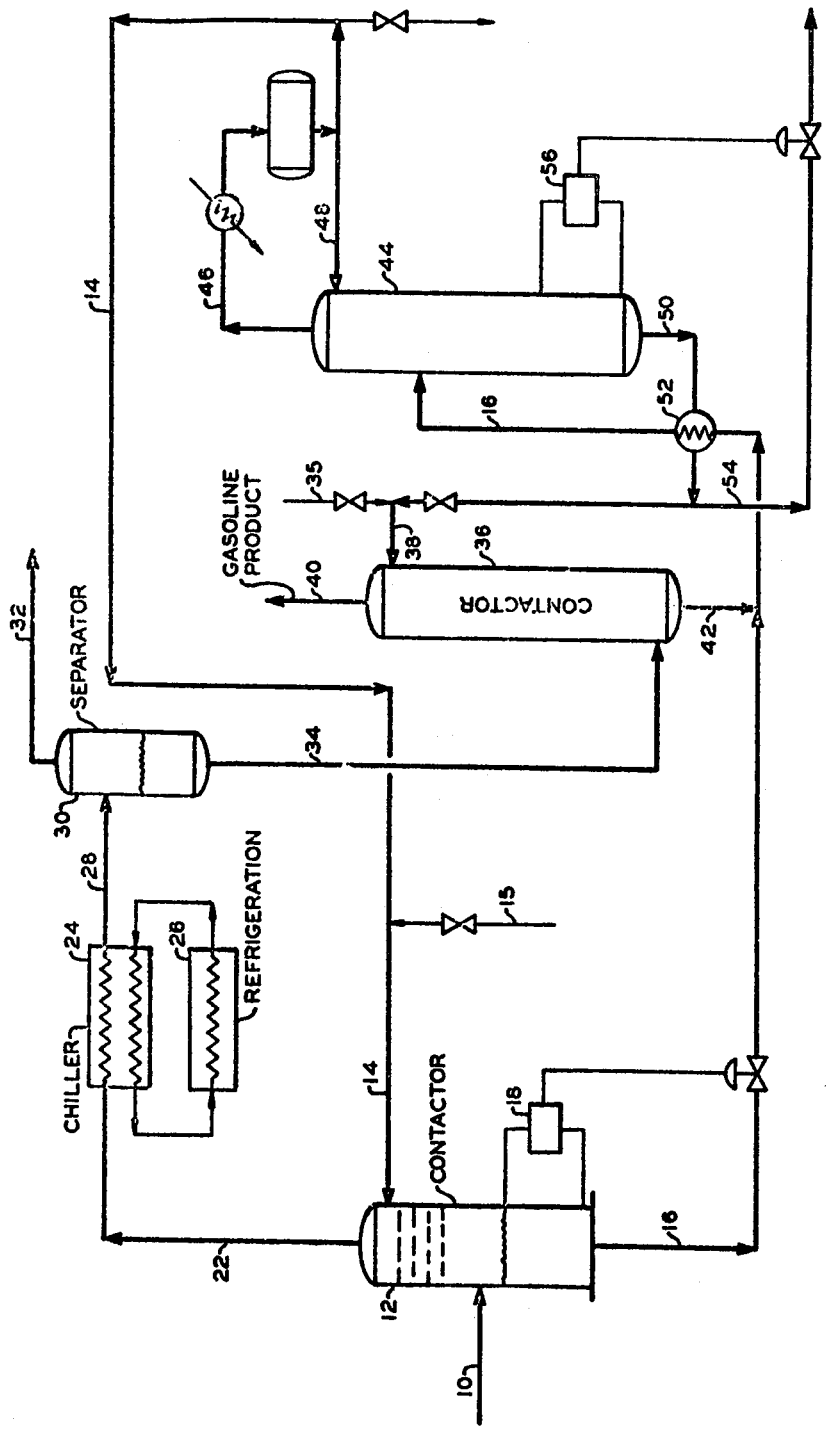

REDUCTION OF HYDRATE FORMATION IN A NATURAL GAS STREAM BY CONTACTING WITH ANIT-FREEZE AGENT

This is a continuation application of our copending application having Ser. No. 101,372, filed on Dec. 24, 1970, now abandoned.

This invention relates to reducing the moisture content of gases and to the recovery of liquid desiccant-antifreeze agents used in the treating of said gases.

It is well known to refrigerate gas streams to facilitate the separation of impurities therefrom, or to facilitate the separation of the various components in gas mixtures. For example, it is common practice to refrigerate a natural gas stream to a temperature low enough to condense some of the heavier hydrocarbons such as propane and heavier which are contained therein. The liquified hydrocarbons are then easily separated from the gaseous residue consisting essentially of methane together with some ethane. If desired, the gas stream can be cooled to a temperature sufficient to condense some or all of the ethane. One problem in reducing the temperature of natural gas streams much below 32° F. is the condensation of water vapor usually contained therein, with resultant freezing thereof to form ice crystals and/or water-hydrocarbon-hydrate crystals. Water-hydrocarbon-hydrate crystals are usually formed at temperatures above 32° F., sometimes as high as 40° F. Said solid crystals plug the heat exchangers in the chilling or cooling system and make operation thereof impossible after a very short time. Carbon dioxide and hydrogen sulfide, if present in the gas, will also freeze out of the gas if it is cooled to sufficiently low temperatures, e.g., in the order of −115° F.

The formation of such solid deposits in natural gas low temperature processing plants has been alleviated in the past by removing as much of the water and carbon dioxide as possible before the natural gas feedstock is cooled below the temperature at which said solids begin to form. One method which has been employed for accomplishing this comprises contacting the gas with high boiling (low vapor pressure) liquid desiccants such as diethylene glycol or triethylene glycol to absorb the water. High boiling desiccants are used in such processes so as to minimize introduction of the desiccant into the gas stream by evaporation. Such processes have the disadvantage of high operating costs, particularly in the recovery of the desiccant. In addition, glycols become very viscous at low temperatures and present a handling problem. Another method which has been employed is to pass the gas through towers containing solid adsorbents such as silica gel, molecular sieve, solid caustic, etc. Such adsorbents and the operating expenses associated with the use thereof are expensive. Because of the expense of such operations, cheaper solutions to the problem have been sought. In recent years an antifreeze such as methyl alcohol has been added to the natural gas feedstock and passed together with the feedstock through the low temperature heat exchange units. As the water is condensed from the gas, it is absorbed by the alcohol to form a liquid alcohol-water phase which separates from the gaseous feedstock being cooled. While, generally speaking, this process has been more economical than the use of the adsorbing desiccants mentioned above, the process is not without problems. For example, when the heavier hydrocarbons condense from the gas feedstocks in contact with the alcohol-water phase, two liquid phases are present in the equipment, a hydrocarbon phase and a water-alcohol phase. Since the alcohol is also soluble in said hydrocarbon phase, it may transfer from the water phase to the larger volume hydrocarbon phase, leaving insufficient alcohol in the water phase, which will then freeze and plug the equipment.

In copending application Ser. No. 101,240, filed of even date herewith, by E. A. Harper, there is disclosed and claimed a process which provides a solution for the above-discussed problems. In the process of said copending application a gas to be treated is contacted with an aqueous liquid desiccant-antifreeze agent in such a manner as to (1) remove at least a portion of the moisture contained in the gas, and (2) introduce a sufficient amount of said agent in vapor phase into said gas so as to prevent the formation of solids in the subsequent low temperature treating steps.

The present invention is an improvement on the process disclosed and claimed in said copending application. The present invention provides an improved, economical, and practical method for recovering the liquid desiccant-antifreeze agent used in the contacting step of said copending application process. In a preferred embodiment, the present invention provides for controlling and/or adjusting the water content of the liquid desiccant-antifreeze agent which is used in a preferred embodiment of the invention of said copending application.

Thus, according to the present invention, there is provided, in a process for reducing the water content of a moisture-containing stream of natural gas and introducing an antifreeze agent into said gas stream, wherein said gas is contacted in a first contacting zone with an amount of an aqueous liquid desiccant-antifreeze agent under temperature and pressure conditions sufficient to absorb at least a portion of said moisture from said gas and simultaneously introduce an amount of said agent into said gas which is sufficient to prevent solids formation in subsequent low temperature processing of said gas, said thus-treated gas is then chilled, and a liquid stream comprising condensed hydrocarbon, water, and said agent is separated from said treated gas, the improvement comprising the steps of: (a) contacting said separated stream with water in a second contacting zone; (b) recovering essentially agent-free condensed hydrocarbon from said second contacting zone; (c) passing a stream comprising water and said agent from said second contacting zone to a fractionation zone; (d) withdrawing a stream comprising a major proportion of said agent and a minor proportion of water from said fractionation zone; (e) returning said stream of step (d) to said first contacting zone as at least a portion of said agent used therein; and (f) withdrawing a stream comprising water from said fractionation zone. In a preferred embodiment, the water content of the liquid desiccant-antifreeze agent used in said first contacting zone is adjusted and/or controlled by adjusting the operating conditions in said fractionation zone of step (d) so as to control the water content of said withdrawn stream of step (d).

The drawing is a diagrammatic illustration of one presently preferred embodiment of the present invention.

Referring now to the drawing, the present invention will be more fully explained. A natural gas feedstock stream consisting essentially of methane and containing relatively small amounts of ethane, propane, butanes, and heavier hydrocarbons, and also saturated with water at 550 psig and 80° F. (55 pounds of water per million cubic feet of gas measured at standard conditions of temperature and pressure) is introduced via conduit 10 into the lower portion of gas-liquid contactor 12. The gas passes upward through the contacting trays shown, countercurrently to a descending stream of treating agent, e.g., aqueous methyl alcohol introduced via conduit 14. Make-up treating agent can be introduced via conduit 15, as needed. About two to six trays of conventional design, e.g., bubble-cap or sieve, are usually sufficient for the alcohol to absorb the major portion of the water from the gas, thus producing a treated gas containing a reduced amount of water. The resulting water-alcohol solution is removed from contactor 12 via conduit 16 responsive to level controller 18 and passed to the alcohol recovery operations described hereinafter.

The contacting of the gas with said agent in contactor 12 can be carried out in any convenient or suitable manner, for example, by bubbling the gas through a contacting tower or vessel countercurrent to a descending stream of the agent. Said contacting tower or vessel can be any suitable type of tower or vessel. For example, a tower provided with any suitable type of contacting device(s) or medium, e.g., bubble-cap trays, sieve trays, or packed with a packing material such as rings or saddles. Thus, the tower may be operated much like a fractionator, i.e., with vapor substantially filling the tower and flowing upward countercurrently to the descending agent which occupies a liquid layer or each of the trays. Or, the tower may be substantially filled with the liquid agent with the gas phase bubbling upward therethrough.

The treated gas stream is withdrawn from contactor 12 via conduit 22 and introduced into chiller zone 24 wherein it is cooled by heat exchange with a cold refrigerant fluid produced by refrigeration unit 26 to a temperature sufficient to condense the heavier hydrocarbons such as propane and heavier from the gas. The chilled gas stream is withdrawn from chiller 24 via conduit 28 and introduced into phase separator 30. Nonliquified residue gas consisting essentially of methane together with some ethane is withdrawn from separator zone 30 via conduit 32 as one product of the process.

The liquids in separator 30 are withdrawn therefrom via conduit 34 and introduced into liquid-liquid contactor 36. Said stream in conduit 34 will comprise the propane and heavier hydrocarbons condensed from the gas stream, together with essentially all of the methyl alcohol and water introduced into the chiller system 24 via conduit 22. Said liquid stream is contacted countercurrently in contactor 36 with a descending stream of water introduced via conduit 38, preferably obtained from a source described hereinafter. However, it is within the scope of the invention to use water from an outside source such as conduit 35. Said contactor 36 can be operated at any suitable temperature, e.g., within the range of from about 40° to about 125° F., and any suitable pressure, e.g., within the range of from about 10 to 500 psig, with both the water and the hydrocarbon phases preferably being in the liquid state. Said water extracts essentially all the alcohol from the condensed hydrocarbons and produces an essentially alcohol-free gasoline (condensed hydrocarbons) stream which is withdrawn from said contactor via conduit 40 as another product of the process.

Bottoms from said contactor 36, comprising an alcohol-water mixture, is removed therefrom via conduit 42, preferably combined with the alcohol-water mixture in conduit 16, and introduced into fractionator 44. An alcohol-rich overhead stream is withdrawn from fractionator 44 via conduit 46, condensed in the condenser shown, passed through the accumulator shown, a portion thereof returned to said fractionator 44 via conduit 48 as reflux, and the remainder introduced into conduit 14 for use in contactor 12 as previously described. Water bottoms from fractionator 44 are removed therefrom via conduit 50, preferably passed through heat exchanger 52, and preferably at least a portion thereof is introduced into conduit 38 for introduction into liquid-liquid contactor 36 and used therein as previously described. Excess water, e.g., the water removed from the natural gas stream being processed, is withdrawn via conduit 54 responsive to liquid level controller 56 operatively connected to the lower portion of said fractionator 44.

The present invention thus provides a practical and economical process for the recovery of the alcohol contained in two wash streams which result from the alcohol treating of a natural gas stream in a cryogenic or low temperature processing plant. Said wash streams, comprising alcohol-water mixtures, one from contactor 12 and the other from contactor 36, are preferably advantageously combined and fractionated to recover water for use in the hydrocarbon contactor 36 and an alcohol-rich liquid for use in the gas contactor 12.

It is more economical to use an aqueous solution of methyl alcohol containing a major proportion of alcohol and a minor proportion of water than to use pure methyl alcohol in gas contactor 12. The use of pure methyl alcohol would result in removing essentially all the water in the gas stream but would introduce an excess amount of alcohol into the treated gas stream in conduit 22 unless the contacting in contactor 12 is carried out at low temperatures, e.g., about −100° F., or lower. However, refrigeration for such processes is expensive. Thus, economics dictate that the contacting in contactor 12 be carried out without refrigeration, if possible. Economics also dictate that only sufficient alcohol be introduced into the gas to prevent ice or hydrate formation because any alcohol so introduced into the gas must subsequently be removed therefrom and recovered for reuse.

For example, when treating a natural gas stream saturated with water vapor at 80° F. and 550 psig (55 pounds of water per million cubic feet of gas measured at standard conditions of temperature and pressure) in contactor 12, the use of an essentially pure methyl alcohol containing about 2 weight per cent water would result in a gas stream effluent therefrom containing only about 1 pound of water and about 350 pounds of methyl alcohol per million cubic feet of gas, assuming the contactor is operated at 80° F. and 550 psig. This is clearly more alcohol than required to prevent one pound of water from freezing. Thus, the water content of the alcohol stream in conduit 14 is preferably increased to about 25 weight per cent, for example, under which conditions the treated gas in conduit 22 will have a water content of about 10 pounds and an alcohol content of about 100 pounds per million cubic feet of gas. The following table illustrates how the alcohol and water contents of the treated gas from a methyl alcohol scrubber varies as the alcohol content of the methanol-water scrubbing agent is varied (In each case natural gas at 550 psig and 80° F. saturated with water is passed into the scrubber as feed gas):

| Methanol Content of Alcohol-Water Contacting Solution, wt.% | Treated Gas Composition, lb./million cu. ft. | |
|---|---|---|
| | Methanol | Water |
| 100 | 420 | 0 |
| 98 | 350 | 1 |
| 90 | 250 | 5 |
| 80 | 150 | 8 |
| 75 | 100 | 10 |
| 50 | 60 | 40 |

Generally speaking, the contacting solutions used will preferably contain from about 51 to about 90, more preferably about 60 to about 85, weight per cent of treating agent, e.g., methyl alcohol, and from about 49 to about 10, more preferably about 40 to about 15, weight per cent water. Said contacting solutions will preferably be used in quantities sufficient to supply from about 50 to 5000, more preferably about 100 to about 1000, pounds of agent per million cubic feet of gas being treated.

A feature of the present invention is that fractionator 44 can be conveniently operated to produce overhead therefrom an alcohol-rich stream containing a major proportion of alcohol and a minor proportion of water which can be adjusted by a suitable choice of operating conditions in said fractionator to produce the optimum composition for the treating liquid used in contactor 12. Thus, said fractionator 44, in combination with said contactor 36, provides real and effective cooperation in recovering the alcohol used to treat the natural gas; particularly when the alcohol-water stream from said contactor 12 is also passed to fractionator 44.

While the invention has been described with particular reference to using methyl alcohol as the liquid desiccant-antifreeze agent in contactor 12, other such agents can be used in the practice of the invention. Any suitable liquid desiccant-antifreeze agent can be used. Suitable agents include those which are miscible with water, are inert or essentially inert with respect to the gas being treated, which have a volatility (high vapor pressure) such as to permit sufficient vaporization thereof into the gas stream being treated under the treating conditions being employed, and which have a low viscosity at the low temperatures used in the subsequent low temperature treating steps. Low viscosity is desirable for ready flow of the liquid agent in the low temperature portions of the plant. Examples of other suitable agents for use in the practice of the invention include, among others, the following: ethyl alcohol, propyl alcohol, isopropyl alcohol, acetone, methyl ethyl ketone, etc. However, methyl alcohol is the presently preferred agent because of a desirable combination of properties, including cost.

Said liquid desiccant-antifreeze agent can be used in contactor 12 in any necessary or desirable amount which is sufficient to remove at least a portion of the moisture contained in the gas being treated, and also introduce sufficient of said agent into said gas for protection in the low temperature steps of the process. The actual amount of agent used in any particular situation will depend, of course, on the water content of the gas being treated, the amount of water to be removed, and the amount of agent to be left in gaseous effluent from the treater. The contacting of the gas to be treated in contactor 12 with said agent can be carried out in any suitable manner, employing any suitable tower or vessel provided with any suitable type of contacting device(s) or medium, e.g., bubble-cap trays, sieve type trays, or the tower can be packed with a packing material such as rings or saddles. Likewise, hydrocarbon-contactor 36 can be any suitable type of contacting apparatus, such as that described for contactor 12.

Operating conditions in the contacting step carried out in contactor 12 will depend upon the gas being treated, the treating agent being used, the amount of water contained in the gas, the amount of said contained water which it is desired to remove from the gas, the amount of said treating agent which it is desired to introduce into the gas for antifreeze purposes, and other interrelated factors. Generally speaking, two of the most important operating variables are temperature and pressure. Generally speaking, the contacting of the gas and treating agent in contactor 12 can be carried out at a temperature within the range of from 0 to 200, preferably 40° to 125°F. The pressures employed in said contactor 12 will depend somewhat upon the temperature and will usually range from 5 to 5000, preferably 100 to 1000, psig. Generally speaking, in most instances, said temperatures and pressures will be governed by the temperature and pressure of the incoming gas stream.

The conditions of temperature and pressure employed in the contactor 12 are also related to the composition, e.g., the water content, of the treating agent being used. As discussed above, the water content of said treating agent can be adjusted and/or controlled by controlling the operating conditions in fractionator 44. Thus, the selection of said operating temperature and operating pressure can be made in view of the desired water content of the treating agent, and vice versa, the water content of the alcohol-rich overhead stream from fractionator 44 can be adjusted in view of the temperature and pressure to be employed in said contactor 12.

The following calculated example will serve to further illustrate the invention.

EXAMPLE

A stream of natural gas consisting essentially of methane is contacted with an aqueous methyl alcohol solution essentially as described above in connection with the drawing. The effluent from the contacting zone is then processed for recovery of the methyl alcohol essentially as described above in connection with the drawing. Flow rates, stream compositions, and operating conditions are tabulated below where the numbers in parentheses refer to elements in said drawing.

| Wet Gas (10) | |
|---|---|
| Flow Rate, million standard cu. ft. per day (MMSCF/D) | 100 |
| Temperature, °F. | 80 |
| Pressure, psig | 550 |
| Composition, mol % | |
| Methane | 90 |
| Ethane plus | 10 |
| Water, lb. per million standard cu. ft. of gas | 55 |
| Contactor (12) | |
| Diameter, ft. | 10 |

-Continued

| | |
|---|---|
| Wet Gas (10) | |
| Height, ft. | 20 |
| Sieve trays, number | 2 |
| Pressure, psig | 550 |
| Temperature, °F. | 80 |
| Scrubbing Solution (14) | |
| Wt. % Methanol | 75 |
| Wt. % Water | 25 |
| Rate, lb./day | 30,000 |
| Freezing Point, °F. about | −150 |
| Make-up Methanol (15), lb./day | 1,000 |
| Treated Gas (22) | |
| Rate, MMSCF/D | 100 |
| Water Content, lb./MMSCF | 10 |
| Alcohol Content, lb./MMSCF | 100 |
| Spent Scrubbing Solution (16) | |
| Wt. % Methanol | 51 |
| Wt. % Water | 49 |
| Rate, lb./day | 24,500 |
| Freezing Point, °F. about | −50 |
| Separator (30) | |
| Pressure, psig | 500 |
| Temperature, °F. | −100 |
| Water in Residue Gas (32), parts per million (PPM) | 0.3 |
| Methanol in Residue Gas (32), PPM | 4 |
| Gasoline in Condensate (34), lb./day | 400,000 |
| Water, lb./day | 900 |
| Methanol, lb./day | 9,000 |
| Contactor (36) | |
| Temperature, °F. | 50 |
| Pressure, psig | 50 |
| Height, ft. | 50 |
| Diameter, ft. | 6 |
| Bubble-Cap trays | 20 |
| Gasoline Product (40) | |
| Water Content, PPM | 100 |
| Alcohol Content, PPM | 10 |
| Washings, (42) | |
| Water, lb./day | 100,800 |
| Alcohol, lb./day | 8,990 |
| Scrubbing Water (38) | |
| Water Content, wt. % | 99.5 |
| Methanol Content, wt. % | 0.5 |
| Rate, lb./day | 100,000 |
| Fractionator (44) | |
| Pressure, psig | 50 |
| Temperature, top °F. | 200 |
| bottom °F. | 300 |
| Height, ft. | 60 |
| Diameter, ft. | 4 |
| Bubble-Cap trays | 25 |

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. In a process for reducing the moisture content of a moisture-containing stream of natural gas without substantail moisture removal prior to introducing an antifreeze agent into said gas stream, wherein said gas, which is at an atmospheric temperature in the range 40°–125°F, is contacted in a first contacting zone with an amount of an aqueous liquid solution containing 51 to 90 weight percent of a low boiling (high vapor pressure) desiccant-antifreeze agent and 49 to 10 weight percent water at a temperature in the range 40°–125°F and pressure conditions sufficient to absorb a major portion of said moisture from said gas and simultaneously vaporize an amount of said agent into said gas which is sufficient to prevent solids formation in subsequent low temperature processing of said gas, said thus-treated gas is then chilled to a temperature sufficient to condense substantially all of the propane and heavier hydrocarbons therefrom leaving a residue gas rich in methane and ethane, and a liquid stream comprising said condensed propane and heavier hydrocarbons, water, and said agent, but at a temperature sufficiently above the eutectic freezing point for the water-agent solution to prevent freezing of the water-agent solution and formation of solids during said chilling, the improvement comprising the steps of:
    a. contacting said separated liquid stream with water in a countercurrent contacting zone under conditions sufficient to substantially extract said agent from said condensed propane and heavier hydrocarbons;
    b. recovering overhead essentially agent-free said condensed propane and heavier hydrocarbons from said countercurrent contacting zone;
    c. passing a bottoms stream comprising water and said agent from said countercurrent contacting zone to a fractionation zone;
    d. withdrawing an overhead stream comprising 51 to 90 weight percent of said agent and 49 to 10 weight percent of water from said fractionation zone;
    e. returning said overhead stream of step (d) to said first contacting zone as at least a portion of said agent used therein;
    f. withdrawing a bottoms stream comprising water from said fractionation zone; and
    g. adjusting the water content of said aqueous solution of said agent in said overhead stream by adjusting conditions in said fractionation zone of step (d) so as to control the water content of said withdrawn overhead stream of step (d).

2. A process according to claim 1 wherein said moisture-containing gas stream is contacted countercurrently with said aqueous agent in said first contacting zone, and a moisture-enriched stream of said agent is withdrawn from said first contacting zone and also introduced into said fractionation zone.

3. A process according to claim 1 wherein: said separated stream in step (a) is contacted countercurrently with said water; and said water is at least a portion of the water stream withdrawn from said fractionation zone in step (f).

4. A process according to claim 1 wherein said aqueous liquid desiccant-antifreeze agent comprises an aqueous solution of methyl alcohol.

5. A process according to claim 4 wherein:
    said moisture-containing gas stream is contacted countercurrently with said aqueous agent in said first contacting zone;
    a moisture-enriched stream of said agent is withdrawn from said first contacting zone and also introduced into said fractionation zone of step (c); and
    said separated stream of step (a) is contacted countercurrently with said water, and said water is at least a portion of the water withdrawn from said fractionation zone in step (f).

6. A process according to claim 5 wherein:
    said contacting in said first contacting zone is carried out at a pressure within the range of from 5 to 5,000 psig;

said aqueous solution of methanol has a water content within the range of from 40 to 15 weight percent; and at least one of said water content and said temperature is adjusted so as to control the amount of methyl alcohol vaporized and introduced into said gas stream.

7. A process according to claim 6 wherein said pressure is within the range of from about 100 to about 1,000 psig.

8. A process according to claim 1 wherein said agent is selected from the group consisting of methyl alcohol, ethyl alcohol, propyl alcohol, isopropyl alcohol, acetone, methyl ethyl ketone, and mixtures thereof.

* * * * *